(12) United States Patent
Morein

(10) Patent No.: US 9,382,833 B2
(45) Date of Patent: Jul. 5, 2016

(54) ACTUATION SYSTEM FOR MULTI-CHAMBER THERMAL MANAGEMENT VALVE MODULE

(71) Applicant: Schaeffler Technologies AG & Co. KG, Herzogenaurach (DE)

(72) Inventor: Alexander Joseph Morein, Royal Oak, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 35 days.

(21) Appl. No.: 14/336,201

(22) Filed: Jul. 21, 2014

(65) Prior Publication Data

US 2015/0027575 A1 Jan. 29, 2015

Related U.S. Application Data

(60) Provisional application No. 61/858,157, filed on Jul. 25, 2013.

(51) Int. Cl.
*F16K 11/065* (2006.01)
*F16K 11/078* (2006.01)
*F01P 7/14* (2006.01)
*F16K 11/16* (2006.01)

(52) U.S. Cl.
CPC ............... *F01P 7/14* (2013.01); *F16K 11/165* (2013.01); *F01P 2007/146* (2013.01); *Y10T 137/87708* (2015.04); *Y10T 137/87732* (2015.04)

(58) Field of Classification Search
CPC ............ F16K 11/0853; F16K 11/0833; F16K 11/0873; F16K 11/165; F01P 2007/146; Y10T 137/87708; Y10T 137/87732
USPC ............. 137/625.19, 625.41, 630.19, 630.21, 137/862, 864, 865
See application file for complete search history.

(56) References Cited

U.S. PATENT DOCUMENTS

| | | | | | |
|---|---|---|---|---|---|
| 1,223,038 | A | * | 4/1917 | Crovo | F16K 11/0856 137/625.19 |
| 2,076,841 | A | * | 4/1937 | Heggem | F16K 5/204 251/164 |
| 2,249,090 | A | * | 7/1941 | Rabinowicz | F24H 9/2035 126/351.1 |
| 2,392,880 | A | * | 1/1946 | Reed | F16K 5/162 251/162 |
| 3,405,601 | A | * | 10/1968 | Clarke | F15B 11/072 137/212 |

(Continued)

FOREIGN PATENT DOCUMENTS

| | | | | |
|---|---|---|---|---|
| DE | 102006055536 | | 6/2008 | |
| FR | 1503926 A | * | 12/1967 | .......... F16K 11/0873 |

*Primary Examiner* — John Fox
*Assistant Examiner* — Seth W Mackay-Smith
(74) *Attorney, Agent, or Firm* — Volpe and Koenig, P.C.

(57) ABSTRACT

A thermal management valve module having at least one flow chamber is provided, with one or more inlet and outlet ports connected to the at least one flow chamber. A first valve body is rotatably positioned in the at least one flow chamber, and includes a fluid pathway that connects a first port to the flow chamber, which allows separate or mixed flows, or blocks the flow, based on the valve body position. A second valve body is rotatably positioned in the at least one flow chamber, and includes a fluid pathway that connects a second port, which allows separate or mixed flows, or blocks the flow, based on the second valve body position. One or more actuators can be used to independently position the first and second valve bodies. An indirect connection, which can be an epicyclic gear arrangement, allows a single actuator to independently position both valve bodies.

19 Claims, 11 Drawing Sheets

(56) References Cited

U.S. PATENT DOCUMENTS

| | | | | |
|---|---|---|---|---|
| 3,499,467 | A | * | 3/1970 | Lang, Jr. ............ F16K 11/0836 137/625.19 |
| 3,570,806 | A | | 3/1971 | Sturman |
| 4,355,659 | A | * | 10/1982 | Kelchner ............ F16K 11/0856 137/597 |
| 4,445,540 | A | * | 5/1984 | Baron ................ F16K 11/0856 137/625.43 |
| 4,655,252 | A | | 4/1987 | Krumhansl |
| 4,774,977 | A | * | 10/1988 | Cohen .................... F16K 27/10 137/271 |
| 4,823,843 | A | * | 4/1989 | Golembiski ............. F23K 5/18 137/605 |
| 5,167,254 | A | * | 12/1992 | Walter ................ F16K 11/0833 137/595 |
| 5,247,964 | A | * | 9/1993 | DeLange .............. F16K 5/0605 137/599.05 |
| 5,269,347 | A | * | 12/1993 | Beasley ................ F16K 11/163 137/607 |
| 6,027,098 | A | * | 2/2000 | Nevrekar .................. F16K 3/04 251/164 |
| 6,568,428 | B2 | * | 5/2003 | Pecci .................... F16K 27/003 137/595 |
| 7,163,194 | B2 | * | 1/2007 | Pervaiz ................. F16K 11/085 251/14 |
| 8,757,202 | B2 | * | 6/2014 | Deng ................. F16K 11/0836 126/116 R |
| 2003/0111628 | A1 | * | 6/2003 | Nanba .................... F02D 9/101 251/214 |
| 2004/0140445 | A1 | | 7/2004 | Pervaiz |
| 2004/0149951 | A1 | * | 8/2004 | Gethmann .............. F16K 31/44 251/291 |
| 2006/0054223 | A1 | * | 3/2006 | Baumgarten .......... B01D 61/06 137/625.19 |
| 2006/0065313 | A1 | * | 3/2006 | Saleri .................... F16K 5/0605 137/625.41 |
| 2006/0118066 | A1 | * | 6/2006 | Martins ................... F01P 7/165 123/41.08 |
| 2010/0282190 | A1 | * | 11/2010 | Stoermer ............ F16K 11/0856 123/41.08 |
| 2011/0062366 | A1 | * | 3/2011 | Thomas ................ F16K 5/0642 251/315.01 |
| 2011/0197985 | A1 | * | 8/2011 | Fontenit ................. F16K 1/446 137/625.19 |

* cited by examiner

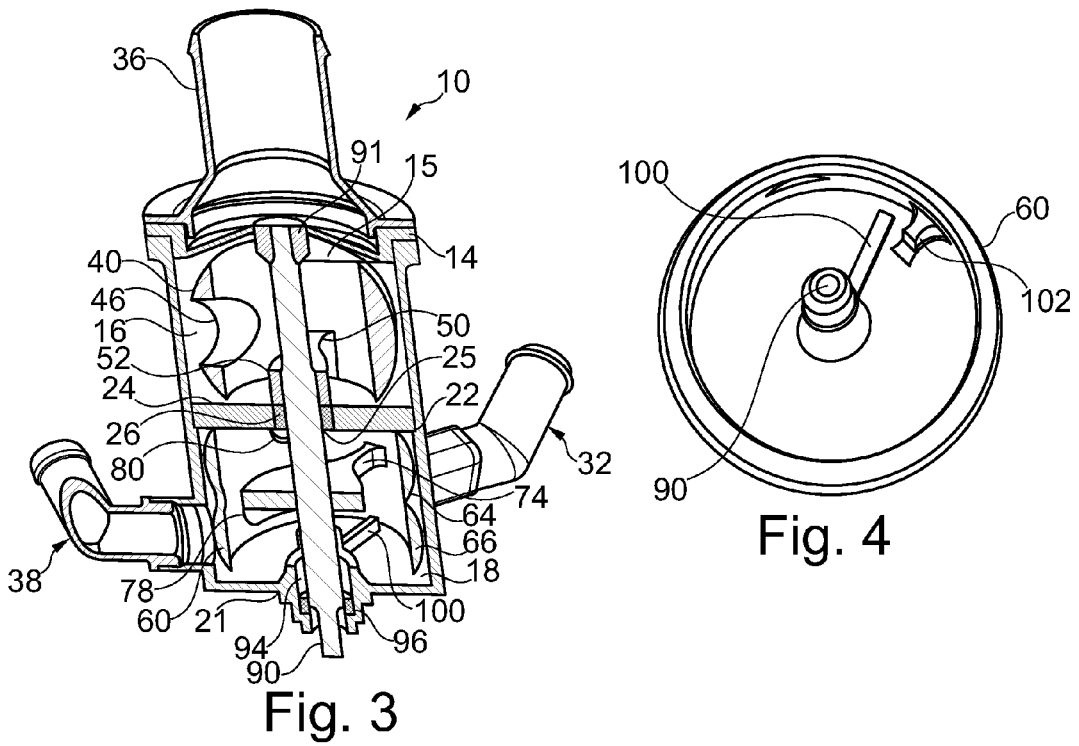
Fig. 3
Fig. 4
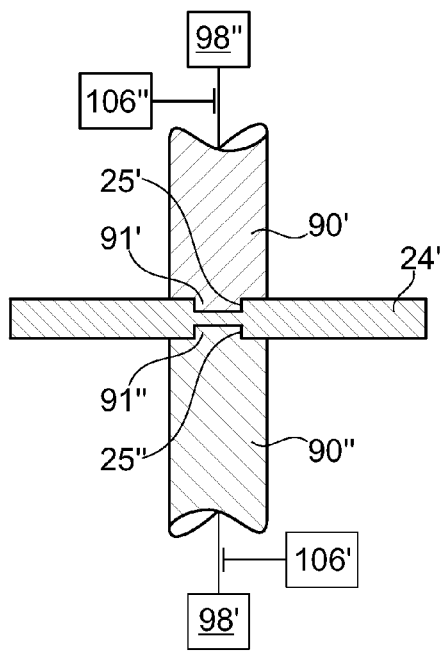
Fig. 5
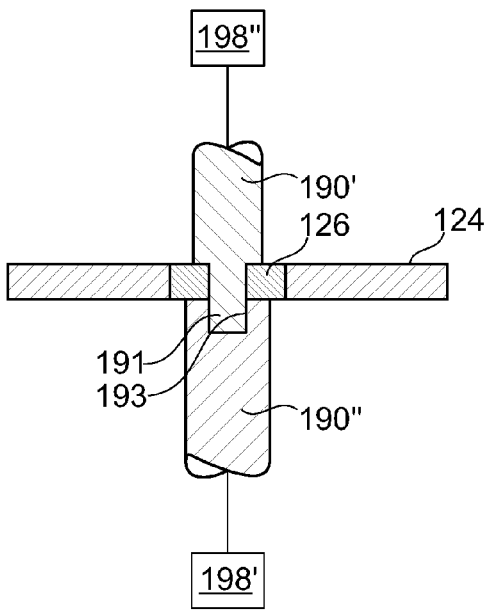
Fig. 6

ACTUATION SYSTEM FOR MULTI-CHAMBER THERMAL MANAGEMENT VALVE MODULE

INCORPORATION BY REFERENCE

The following documents are incorporated herein by reference as if fully set forth: U.S. Provisional Application No. 61/858,157, filed Jul. 25, 2013.

FIELD OF INVENTION

The present invention relates to thermal management systems used to direct coolant flows in vehicles, particularly for direction of coolant fluid flows in connection with the engine and various other systems in motor vehicles.

BACKGROUND

In automotive applications, there is a push for energy efficiency. One way to increase efficiency of motor vehicles is to control the coolant flows to and from the internal combustion engine so that the engine operates at a peak operating temperature. It has been known to use switchable coolant pumps so that the coolant flow is switched off while the engine heats up from a cold start more quickly. Additionally, throttling of coolant flows is also known using a thermal management module; however, the known thermal management module valves only include provisions for providing the coolant at a single outlet temperature.

One known prior art valve used in connection with a thermal management system is disclosed in DE 10 2006 055 536. In this case, a rotary valve having two coaxial rotary valve bodies located within a housing are provided. Here the inlet is in an axial direction and, depending upon the location of the coaxial valve bodies, the coolant flow is directed to a first or second outlet that can be separately switched off and on in order to control the flow of coolant from the water pump to various heat exchangers used in connection with the engine and various other systems, such as an oil cooler. However, there is no possibility for providing different outlet temperatures from the device. Further, a separate actuator is required for each of the coaxial rotary valve bodies.

It would be desirable to provide a way for allowing coolant at different temperatures to be available to different motor vehicle systems and engine components. It would also be desirable to achieve this in a cost efficient manner within a minimum space requirement. It would also be desirable to control the position of the rotary valve bodies within such valves in defined and efficient manner.

SUMMARY

Briefly stated, a thermal management valve module is provided which includes a housing with at least one flow chamber located therein. A first valve body is rotatably positioned in the housing, and controls the opening and closing of a first port located on the housing. A second valve body is rotatably positioned in the housing and controls the opening and closing of a second port located on the housing. The first valve body includes a fluid pathway that allows flow through the first port in a first rotational position, prevents flow from the first port in a second rotational position, and throttles the flow from the first port in an intermediate position. The second valve body includes a fluid pathway that allows flow through the second port in a first rotational position of the second valve body, prevents flow from the second port in a second rotational position of the second valve body, and throttles the flow from the second port in an intermediate position of the second valve body. An actuator arrangement controls the positions of the first and second valve bodies, and includes an actuator shaft that extends axially through the valve bodies that is connected rotationally fixed to one of the valve bodies, and includes an indirect connection to the other of the valve bodies such that movement of the actuator shaft does not require a corresponding direct movement of the other valve body. This allows for independent positioning of the valve bodies using a single actuator connected to the shaft.

In one preferred arrangement, an isolating wall is located in the housing that separates the housing into a first flow chamber and a second flow chamber, and the first valve body is located in the first flow chamber and the second valve body is located in the second flow chamber.

In one preferred arrangement, the first port is a first inlet port that connects to the first flow chamber, and an additional port, which is preferably a first outlet port is located on the housing that connects to the first flow chamber. The second port is a second inlet port that connects to the second flow chamber, and a second additional port, which is a second outlet port is located on the housing that connects to the second flow chamber. The first valve body includes a fluid pathway that connects the first inlet port to the first outlet port in the first rotational position, prevents flow from the first outlet port in the second rotational position, and throttles the flow from the first inlet port to the first outlet port in an intermediate position. The second valve body includes a fluid pathway that connects the second inlet port and the second outlet port in a first rotational position of the second valve body, prevents flow from the second outlet port in a second rotational position of the second valve body, and throttles the flow from the second inlet port to the second outlet port in an intermediate position of the second valve body.

In one aspect of the invention, an additional port, which can be an additional inlet port, is located on the housing and connects to the first flow chamber, and the first valve body is rotatably movable in the first flow chamber to a third rotational position in which the fluid pathway connects the additional inlet port with the first flow chamber, and the first valve body is rotatably movable to a second intermediate position to provide a flow path from the first port and the additional port which allows the flows to mix in the first chamber and the mixed first chamber flow is delivered to a first outlet port connected to the first chamber. This allows controlled mixing of, for example, coolant fluid at different temperatures so that the temperature of the coolant fluid delivered by the first outlet can be at a first temperature.

In another aspect, an additional port, which can be an inlet port, is also located on the housing and connects to the second flow chamber. The second valve body is rotatably movable in the second chamber to a third rotational position in which the fluid pathway connects the additional inlet port of the second flow chamber and the second outlet port. The second valve body is also rotatably movable to a second intermediate position to provide a flow path from the second inlet port and the additional inlet port of the second flow chamber which allows the inlet flows to mix in the second chamber and the mixed second chamber flow is delivered to the second outlet port. This allows controlled mixing of, for example, coolant fluid at different temperatures so that the temperature of the coolant fluid delivered by the second outlet port can be at a second temperature, independently controlled from the first temperature.

In one preferred arrangement, the direct connection is to the first valve body. The indirect connection comprises an indexing arm connected to the actuator shaft, and a positioning catch is located on the second valve body in a same axial plane as the indexing arm. The indexing arm is adapted to rotate at least about 355° from a position in which it contacts a first face of the positioning catch to a position in which it contacts an opposite face of the positioning catch. Based on this, in order to position the second valve body, the actuator shaft is rotated to a position in which the indexing arm contacts the positioning catch, and the actuator can then rotate the second valve body to the desired position—i.e., the first, second or third rotational positions, the first or second intermediate positions, as well as throttled or proportional mixing positions therebetween. Then, by reversing the rotation direction of the actuator shaft, the first valve body can be moved to a desired rotational position—i.e., the first, second or third rotational positions, the first or second intermediate positions, as well as throttled or proportional mixing positions therebetween—by movement up to about 355° before it would contact the second face of the positioning catch and affect the position of the second valve body.

Preferably, the second valve body is rotationally fixed in position by friction created by seals at the second inlet and the second outlet. The holding force for the second valve body can be adjusted by the selection of the surface finish and/or by applying a coating on the second valve body.

In a preferred arrangement, a capacitive sensor is connected to the actuator shaft to detect a rotary contact position with the positioning catch. A rotary position sensor is preferably also located along the actuator shaft so that the positions of both valve bodies can be determined.

In another aspect of the invention, the direct connection is to the second valve body. The indirect connection comprises an epicyclic gear arrangement. Multiple different arrangements can be provided, and in a first preferred epicyclic gear arrangement, a sun gear is connected to the actuator shaft to act as the input gear, at least one planet gear engages the sun gear and also engages a ring gear on or connected to the first valve body. Here, the ring gear acts as the output gear, and the at least one planet gear is held on a stationary planet arm.

In one preferred arrangement, the planet arm extends from an actuator shaft support connected to the isolating wall or directly from the isolating wall, in the form of an axle.

In a preferred arrangement, first valve body is hollow and the gear ring is located on an inner periphery of the first valve body.

In one preferred arrangement, the sun gear and at least one planet gear provide a gear reduction of 8:1 or greater, so that a full rotation of the actuator shaft only rotates the first valve body 45°. Accordingly, the actuator shaft can be rotated until the first valve body is moved to a desired rotational position—i.e., the first, second or third rotational positions, the first or second intermediate positions, as well as throttled or proportional mixing positions therebetween. The actuator can then rotate the second valve body to the desired position—i.e., the first, second or third rotational positions, the first or second intermediate positions, as well as throttled or proportional mixing positions therebetween—by rotating up to + or −180°. This can result in movement of up to + or −22.5° of the first valve body—which needs to be accounted for in the size of the fluid opening in the first valve body so that minor deviations in position still allow the desired flow into the first flow chamber from the first and/or additional inlet(s) that is directed to the first outlet. Alternatively, lower gear ratios of, for example, 2:1 or 4:1 could be used, or higher gear ratios for even less positional deviation of the first valve body during positioning of the second valve body may be useful in certain applications.

A positioning sensor is preferably located on the actuator shaft so that the positions of the valve bodies can be tracked and controlled.

In additional preferred embodiments, the epicyclic gear arrangement can have various configurations. In a second configuration, the sun gear is the input component, fixed to the actuator shaft, the planet arm with at least one planet gear is fixed to the valve body as the output component, and the ring gear is fixed to the stationary housing as the fixed component. In a third configuration, the planet arm with the at least one planet is the input component, fixed to the actuator shaft, the ring gear is fixed to the valve body as the output component, and the sun gear is fixed to the housing as the fixed component. In a fourth configuration, the planet arm with the at least one planet is the input component, fixed to the actuator shaft, the sun gear is fixed to the valve body as the output component, and the ring gear is fixed to the housing as the fixed component. In a fifth configuration, the ring gear is the input component, fixed to the actuator shaft, the planet arm is fixed to the valve body as the output component, and the sun gear is fixed to the housing as the fixed component. In a sixth configuration, the ring gear is the input component, fixed to the actuator shaft, the sun gear is fixed to the valve body as the output component, and the planet arm is fixed to the housing as the fixed component.

In another aspect, a thermal management valve module is provided having a housing and an isolating wall located in the housing that separates the housing into a first flow chamber and a second flow chamber that are isolated from one another. A first inlet port on the housing connects to the first flow chamber, a first outlet port on the housing connects to the first flow chamber, a second inlet port on the housing connects to the second flow chamber, and a second outlet port on the housing connects to the second flow chamber. A first valve body is rotatably positioned in the first flow chamber, with the first valve body including a fluid pathway that, in a first rotational position, connects the first inlet port and the first outlet port, and in a second rotational position, prevents flow from the first outlet port, and in an intermediate position, throttles the flow from the first inlet port to the first outlet port. A second valve body is rotatably positioned in the second flow chamber, with the second valve body including a fluid pathway that in a first rotational position of the second valve body connects the second inlet port and the second outlet port, and in a second rotational position of the second valve body, prevents flow from the second outlet port, and in an intermediate position of the second valve body throttles the flow from the second inlet port to the second outlet port. An actuator arrangement controls the positions of the first and second valve bodies, and includes a first actuator shaft connected to the first valve body and a second actuator shaft connected to the second valve body, the first and second actuator shafts extending along a common axis. The first and second actuator shafts are connected to separate actuators in order to separately position the valve bodies to achieve the desired flows.

In one preferred arrangement, the isolating wall includes pocket bores and the ends of the first and second shafts are supported for rotation in the pocket bores. In another preferred arrangement, a central opening is located in the isolating wall and the first actuator shaft includes an end that extends through the central opening and is received in a corresponding opening in a facing end of the second actuator shaft.

Preferably, separate positioning sensors are provided for the first and second actuator shafts in order to control the positions of the valve bodies.

These arrangements are particularly useful as thermal module control valves for use in connection with a motor vehicle engine cooling system. Here, the motor vehicles includes an engine as a heat source, as well as a cooling fluid system for transporting fluid from the heat source to a heat exchanger, as well as a thermal management valve module according to the invention. Here, the actuator of the thermal management valve control module is connected to an engine control module for the motor vehicle. The first inlet port is connected directly to a fluid pathway from the heat source. The additional inlet port of the first flow chamber is connected to a return from the heat exchanger, which provides cooled fluid, with the heat exchanger also including an inlet that is connected to the heat source. The first outlet port is connected to a cooling fluid pump. The first valve body is movable so that the fluid directed by the valve module back to the pump for return to the heat source is one of: directly recirculated fluid from the heat source; cooling fluid that has been cooled by the heat exchanger; or a mixture of both the fluid directly from the heat source and the cooled fluid from the heat exchanger, so that fluid at a temperature controlled by the control module is returned via the pump to the heat source.

Preferably, the second inlet port is also connected by the cooling fluid system directly to the heat source or an additional heat source, and the additional inlet port of the second flow chamber is connected to a return from the heat exchanger that cools the fluid. The second outlet port is connected to an additional heat exchanger. The second valve body is movable so that the fluid circulated to the additional heat exchanger via the valve module is one of: directly recirculated fluid from the heat source; cooling fluid that has been cooled by the heat exchanger; or a mixture of both the fluid directly from the heat source and the cooled fluid from the heat exchanger so that fluid at a temperature controlled by the control module is directed to the additional heat exchanger, which can be at a temperature that is different than the temperature of the fluid from the first flow chamber.

This arrangement is particularly useful in connection with internal combustion engines so that heat from the engine block can be directly recirculated via the water pump as the engine comes up to operating temperature in order to allow it to reach an operating temperature more quickly. Thereafter, fluid from the first flow chamber that is set at a desired temperature can be maintained by mixing either the directly recirculated heated fluid from the engine with fluid from the radiator in order to maintain the engine at a desired operating temperature. At the same time, fluid from the second flow chamber can be independently mixed in order to provide fluid from the cooling system at a different temperature to an additional heat exchanger, which can be, for example, a passenger compartment heat exchanger, an oil cooler heat exchanger, a transmission fluid cooler heat exchanger, an EGR cooler, etc.

This system can also be used for an electric vehicle or a hybrid vehicle where the heat source can be the battery pack which also requires cooling, and cooling fluid at different temperatures can be provided for cooling the battery pack and the passenger compartment heat exchanger.

BRIEF DESCRIPTION OF THE DRAWINGS

The foregoing Summary and the following detailed description will be better understood when read in conjunction with the appended drawings, which illustrate a preferred embodiment of the invention. In the drawings:

FIG. 3 is a perspective view, partially in cross section, through the thermal management valve module FIGS. 1 and 2.

FIG. 4 is a perspective view looking down at the isolating wall separating the first and second flow chambers in the thermal management valve module in FIGS. 1-3.

FIG. 5 is an alternate arrangement of the actuating shaft used to control movement of the first and second valve bodies.

FIG. 6 is a second alternate embodiment of the actuating shafts used to control movement of the first and second valve bodies.

DETAILED DESCRIPTION OF THE PREFERRED EMBODIMENTS

Figure 1:
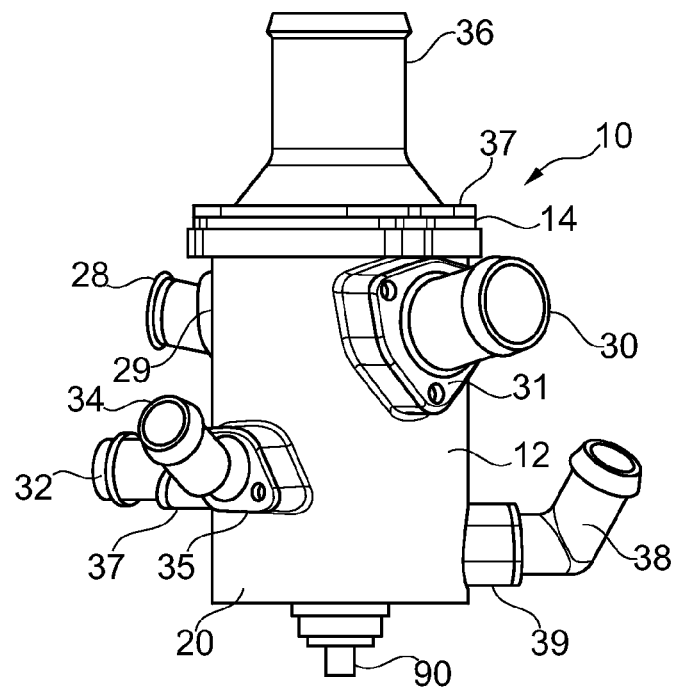
FIG. 1 is an elevational view of a first embodiment of a thermal management valve module according to the invention.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft or rotating part. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 2:
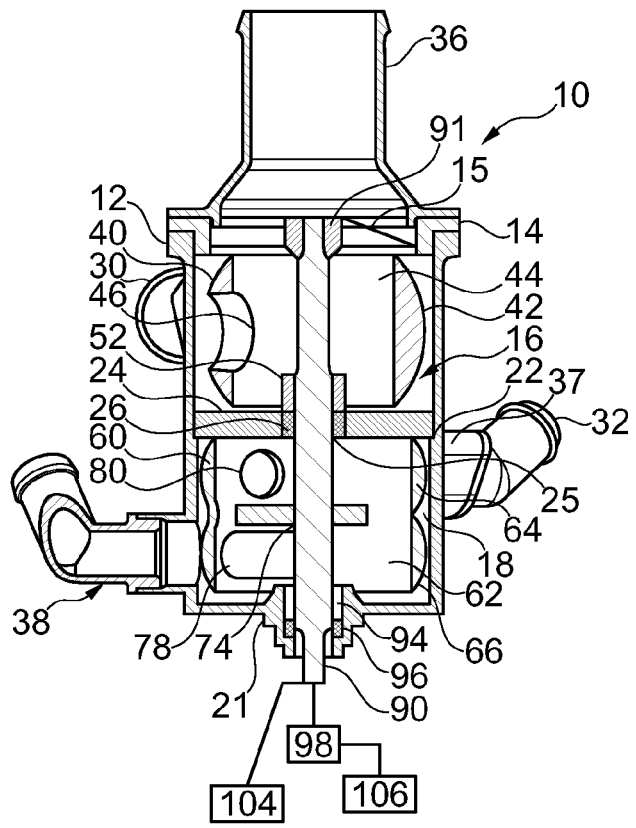
FIG. 2 is a cross-sectional view through the thermal management valve module of FIG. 1.

Referring now to FIGS. 1-3, a first embodiment of a thermal management valve module 10 is shown. As shown in FIG. 1, the valve module 10 includes a valve housing 12 formed with a preferably cylindrical housing wall 20 having a base 21 with a centering feature. An upper end of the valve housing 12 is closed via an end cover 14 having arms 15 which support a center support 91 for an actuator shaft 90 shown in detail in FIGS. 2 and 3, which is discussed in detail below. The housing 12 is preferably divided into a first flow chamber 16 and a second flow chamber 18 by an isolating wall 24. In a preferred embodiment, the isolating wall 24 is a separate disk that is seated on a shoulder 22 formed on an inside of the housing wall 20. This isolating wall 24 can be seated with a seal, if desired. Additionally, it can be formed of an insulating material in order to provide thermal insulation between the first and second flow chambers 16, 18.

As shown in FIGS. 2 and 3, the isolating wall 24 includes an opening 25 through which the actuator shaft 90 extends. A seal 26 can be pressed in the opening 25 in order to provide sealing against the actuator shaft 90. The seal 26 can also act as a bearing for supporting the shaft 90.

As shown in detail in FIG. 1, a plurality of inlet and outlet ports are connected to the housing 12. A first port, which is preferably a first inlet port 28, is located on the housing 12 and connects to the first flow chamber 16. Preferably, the first inlet port 28 is connected to the housing 12 via a mounting flange 29. This can be welded, screwed, adhered or otherwise connected to the valve housing 12. An additional port 30, preferably an additional inlet port, is preferably located on the valve housing 12 that connects to the first flow chamber 16. This additional inlet port 30 is also connected to the valve housing 12 via a mounting flange 31. A first outlet port 36 is preferably also located on the valve housing 12 that connects to the first flow chamber 16. This is connected via a flange 37, shown in FIG. 1, which can be placed over the end disk 14 and can be sealed in position via a gasket or sealing material. The mounting flanges 29, 31, 37 can be connected via screws, welding, adhesive, or any other suitable means.

A second port 32, preferably a second inlet port, is located on the valve housing 12 and connects to the second flow chamber 18. Preferably an additional port 34, preferably an additional inlet port 34, is also located on the valve housing 12 and connects to the second flow chamber 18. A second outlet port 38 is located on the valve housing 12 and connects to the second flow chamber 18. The second inlet port 32, the additional inlet port 34, as well as the second outlet port 38 are preferably connected via respective mounting flanges 33, 35, 39 to the housing wall 20 of the valve housing 12. The mounting flanges 33, 35, 39 can be connected via screws, welding, adhesive, or any other suitable means.

Referring to FIGS. 2 and 3, a first valve body 40 is rotatably positioned in the first flow chamber 16. The first valve body 40 is preferably a spheroid body having an outer surface 42 defined in cross-section by a curved shape that remains constant as it extends in a peripheral direction about a rotational axis. The inlet and outlet port openings in the housing 12 that engage the spheroid body forming the first valve body 40 have a complementary sealing seat located around the respective inlet and outlet openings that engage the spheroid body. The valve body 40 preferably has a hollow center 44. A fluid pathway is defined through the first valve body 40 that connects the first inlet port 28 to the first flow chamber 16, and preferably to the first outlet port 36 in a first rotational position of the first valve body 40, and that prevents flow from the first outlet port 36 in a second rotational position of the first valve body 40. Preferably the first valve body 40 throttles the flow from the first inlet port 28 to the first outlet port 36 in an intermediate position. The first valve body 40 has a fluid opening 46 is defined through the valve body wall to the hollow center 44. As shown in FIG. 3, preferably at least one support web 50 extends from the outer wall of the valve body 40 to a center shaft connection 52 adapted for support on or connection to the shaft 90. The opening 46 in the valve body 40 can connect one or both of the first inlet port and additional inlet port 28, 30 to the first outlet port 36 via the hollow center 44 and the spaces between the arms 15 of the end disk 14. The first valve body 40 is rotatably movable in the first flow chamber to a third rotational position in which the fluid pathway connects the additional inlet port 30 and the first outlet port 36, as well as to a second intermediate position in which the flow from the first inlet port 28 and the additional inlet port 30 is mixed in the first flow chamber 16 and delivered to the first outlet port 36. The second intermediate position is controllable by rotatable movement of the first valve body 40 so that the proportion of flow from the first inlet port 28 and the additional inlet port 30 is controlled so that, for example, a volume of fluid at a first temperature from the first inlet port 28 is proportionally adjustable relative to a volume of fluid at a second temperature from the additional inlet port 30 so that a desired temperature fluid is delivered to the first outlet port 36.

Still with reference to FIGS. 2 and 3, a second valve body 60 is rotatably positioned in the second chamber 18. The second valve body 60 includes a fluid pathway that connects the second inlet port 32 to the second flow chamber 18, and preferably to the second outlet port 38 in a first rotational position of the second valve body 60. The second valve body 60 is rotatable to a second rotational position that prevents flow from the second outlet port 38. Additionally, the second valve body 60 is movable to an intermediate position in which the flow from the second inlet port 32 to the second outlet port 38 is throttled. Preferably, the second valve body 60 is also formed as a spheroid body and the inlet and outlet ports in the housing 12 that engage the second valve body 60 have a complementary sealing seat located around the respective inlet and outlet port openings that engage the spheroid body. As shown in detail in FIGS. 2 and 3, the second valve body 60 includes a first part spheroid outer surface 64 and a second part spheroid surface 66, with the first part spheroid surface 64 being aligned with the opening in the valve housing for the second and fourth inlet ports 32, 34 and a second part spheroidal surface being aligned with the second outlet port 38. The valve body 60 preferably has a hollow center 62 and the wall of the valve body 60 includes an elongated inlet opening 78 as well as an outlet opening 80. A support web 74 preferably extends from the valve body wall to a center area for engagement or support on the actuator shaft 90.

Preferably, the second valve body 60 is rotatably movable in the second chamber 18 to a third rotational position in which the fluid pathway connects the additional inlet port 34 of the second flow chamber 18 and the second outlet port 38. Additionally, the second valve body 60 is movable to a second intermediate position of the second valve body 60 in which the flow from the second inlet port 32 and the additional inlet port 34 of the second flow chamber 18 is mixed in the second flow chamber 18 and is delivered to the second outlet port 38. This allows a mixture of flows from the second inlet 32 and fourth inlet 34 to be mixed depending upon a rotational position of the second valve body 60 allowing for example, a specific temperature of the fluids being transferred through the thermal management valve module 10 to be controlled in a similar manner as discussed above in connection with the first valve body 40 in the first flow chamber 16.

Due to the isolated arrangement of the first flow chamber 16 and the second flow chamber 18, two different outlet temperatures can be provided from the outlets 36 and 38 of the first and second flow chambers 16, 18.

Those skilled in the art will recognize that a plurality of isolated flow chambers 16, 18, etc. can be provided, if desired. Each of these flow chambers can have a plurality of inlet ports and/or outlet ports in order to allow different flow controls.

Still with reference to FIGS. 2 and 3, the actuator shaft 90 extends axially through the valve housing 12 and is supported via an upper support bearing 91, an intermediate support via the bearing/seal 26 in the isolating wall 24, and a lower bearing 94. The lower bearing 94 can also provide a sealing function to seal the lower end of the actuator shaft 90 from the actuator. Alternatively, a seal 96 can be provided. A rotary actuator 98 is connected to the actuator shaft 90. Both valve bodies 40, 60 can be directly connected to the shaft 90 which would only allow adjustment of the valve bodies at the same time and the same amounts, limiting the functionality of the thermal management valve module 10.

Figure 10:
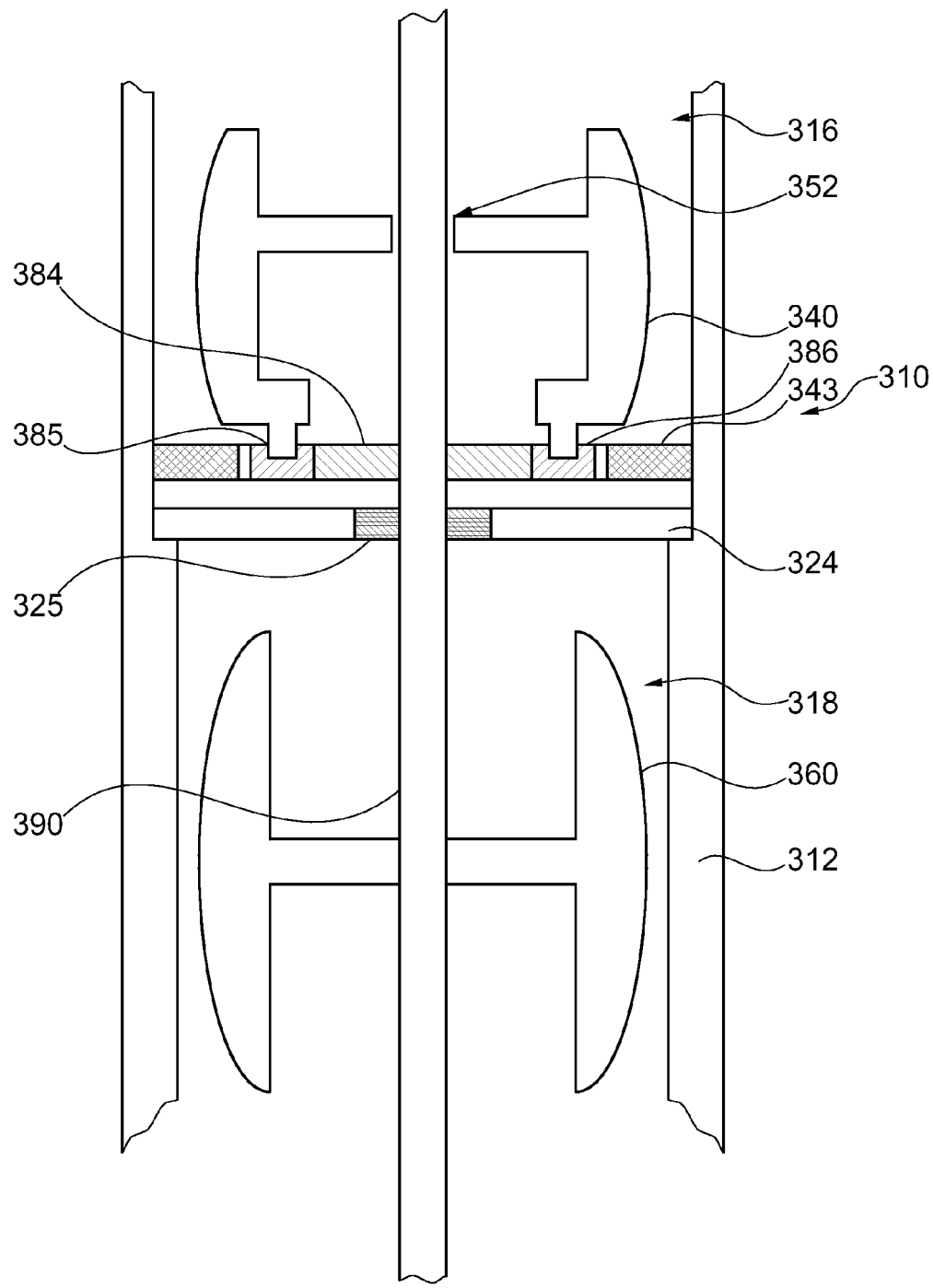
FIG. 10 is a cross-sectional view of a fourth embodiment of a thermal valve management module showing an epicyclic gear arrangement for controlling movement of the first and second valve bodies.

In order to provide independent positioning control of the first and second valve bodies 40, 60, in a first preferred embodiment, the first valve body 40 is fixed to the actuator shaft 90 via the shaft connection 52 on the support web 50. The second valve body 60 is preferably rotatably supported for movement about the actuator shaft 90 via the support web 74. Alternatively, as shown in FIG. 10, the second valve body 60 can be supported via a closed base having an opening with a clearance fit, indicated at 97, to the actuator shaft 90, and an upper rim that is slidably engaged in a corresponding groove 98 in the isolating wall 24, or other features on the housing 12 or the isolating wall 24. As shown in FIG. 4, an indexing arm 100 is affixed to the actuator shaft 90. An opposing positioning catch 102 is located within the hollow center 62 of the second valve body 60. The indexing arm 100 is adapted to rotate at least about 355° from a position in which it contacts a first face of the positioning catch 102 to a position in which it contacts an opposite face of the positioning catch 102. Based on this, in order to position the second valve body 60, the actuator shaft 90 is rotated to a position in which the indexing arm 100 contacts the positioning catch 102, and the actuator 98 can then rotate the second valve body 60 to the desired position—i.e., the first, second or third rotational positions, the first or second intermediate positions, as well as throttled or proportional mixing positions therebetween. The second valve body 60 is preferably held in position by friction with the sealing elements at the inlet ports 32, 34 and outlet port 38, and can be increased or decreased by surface coatings or the surface finish. The actuator shaft 90 can then be rotated in the opposite direction up to about 355° in order to directly position the first valve body 40 in its first rotational position, second rotational position, intermediate position, third rotational position, or second intermediate position as well as to throttle or allow proportional flow control from one or both of the inlet ports 28, 30 in order to achieve the desired flow through the first flow chamber 16. Through this arrangement where the actuator shaft 90 is releasably connectable to the second valve body 60, independent positioning of the two valve bodies 40, 60, is possible.

Figure 16:
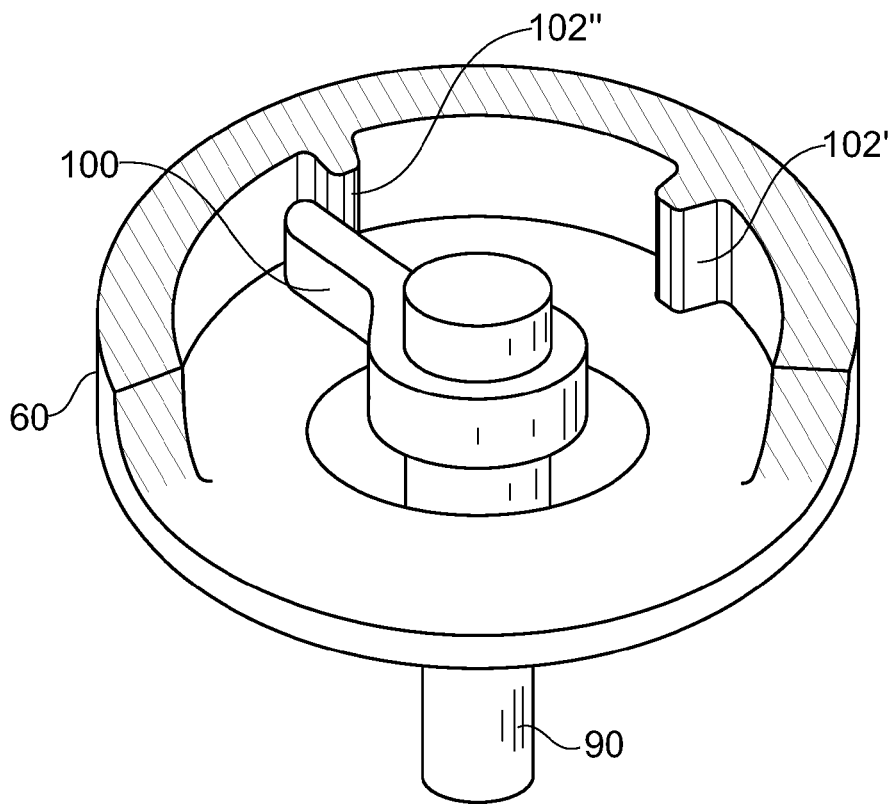
FIG. 16 is a view similar to FIG. 3 showing an alternate positioning arrangement for the second valve body with two positioning catches located thereon.
Figure 17:
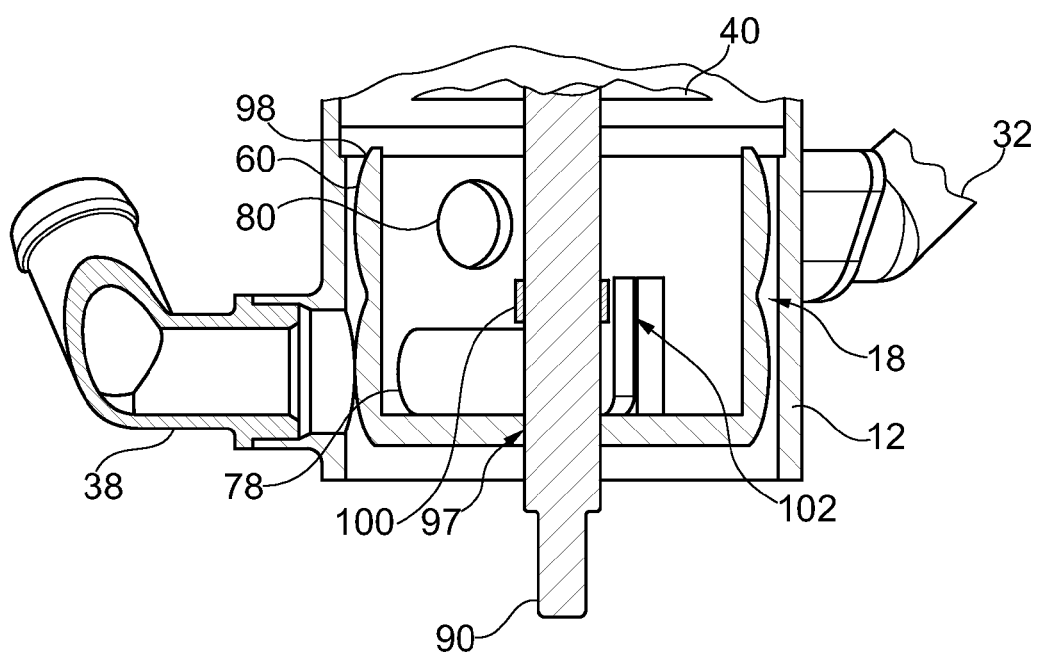
FIG. 17 is a partial cross-sectional view of a thermal management valve module similar to FIG. 2 showing an alternate support arrangement for the second valve body.

An alternate arrangement is shown in FIG. 16 in which first and second positioning catches 102', 102" are located in the second valve body 60, spaced apart at different positions so that the motion of the first valve body 40 is constrained to be some value less than 360°. This can be used to set up "hard stops" for controls calibration.

Referring again to FIG. 2, a capacitive sensor 104 is preferably connected to the actuator shaft 90 to detect a rotary contact position with the positioning catch 102. A rotary position sensor 106 is preferably also located along the actuator shaft or located in the rotary actuator 90 so that the positions of both valve bodies can be determined.

Referring now to FIG. 5, an alternate embodiment for actuation of the valve bodies 40 and 60 independently of one another is shown. Here, two separate actuator shafts 90', 90" are provided, each of which is connected to a separate rotary actuator 98', 98". The isolating wall 24' includes pocket bores 25', 25" which receives stub ends 91', 91" of the respective actuator shafts 90', 90". This allows the actuator shafts 90', 90" to be separately actuated with the first valve body 40 being connected directly to the first actuator shaft 90' and the second valve body 60 being directly connected to the second actuator shaft 90" for direct, separate positioning of the valve bodies 40, 60. Separate position sensors 106', 106" are provided for each of the actuator shafts 90', 90", and can be located on the actuator shafts 90', 90" or can be connected to the rotary actuators 98', 98".

Referring to FIG. 6, a second alternate embodiment for actuation of the valve bodies 40, 60 is shown using two shafts 190', 190". Here, the first shaft 190' includes a pin end 191 which extends through a support seal/bearing 126 located in the isolating wall 124 (which is similar to the isolating wall 24 discussed above). The pin end 191 extends into a pocket bore 193 located in the facing end of the second shaft 190". The first valve body 40 is directly connected to the first shaft 190' and the second valve body 60 is directly connected to the second actuator shaft 190" in order to allow direct rotational positioning. Here, rotatory drives 198', 198" are connected to each of the actuator shafts 190', 190".

Figure 7:
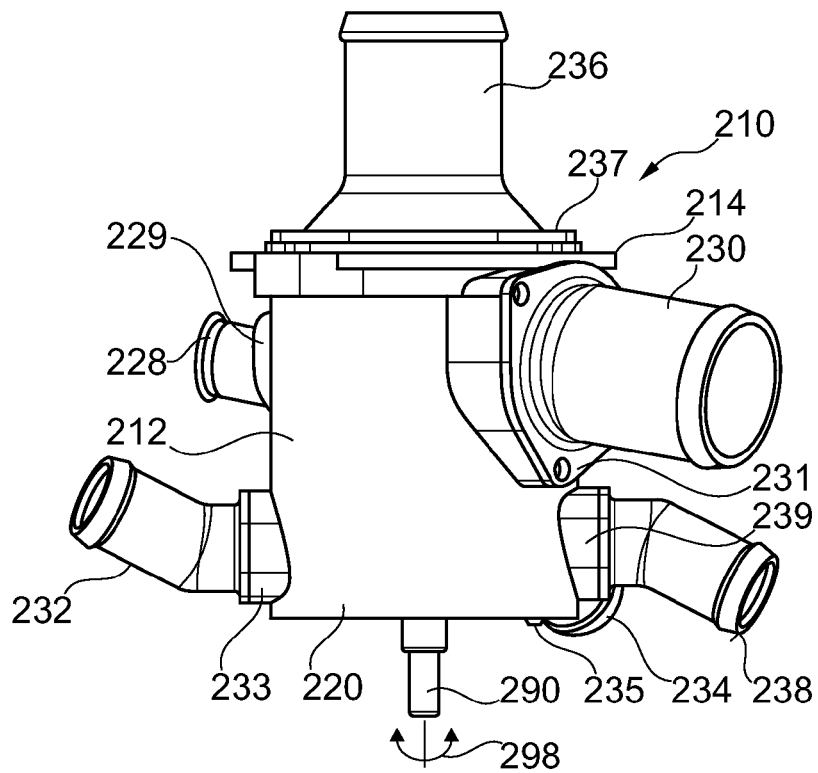
FIG. 7 is an elevational view of an additional embodiment of a thermal management valve module with a third embodiment of the actuator arrangement.
Figure 8:
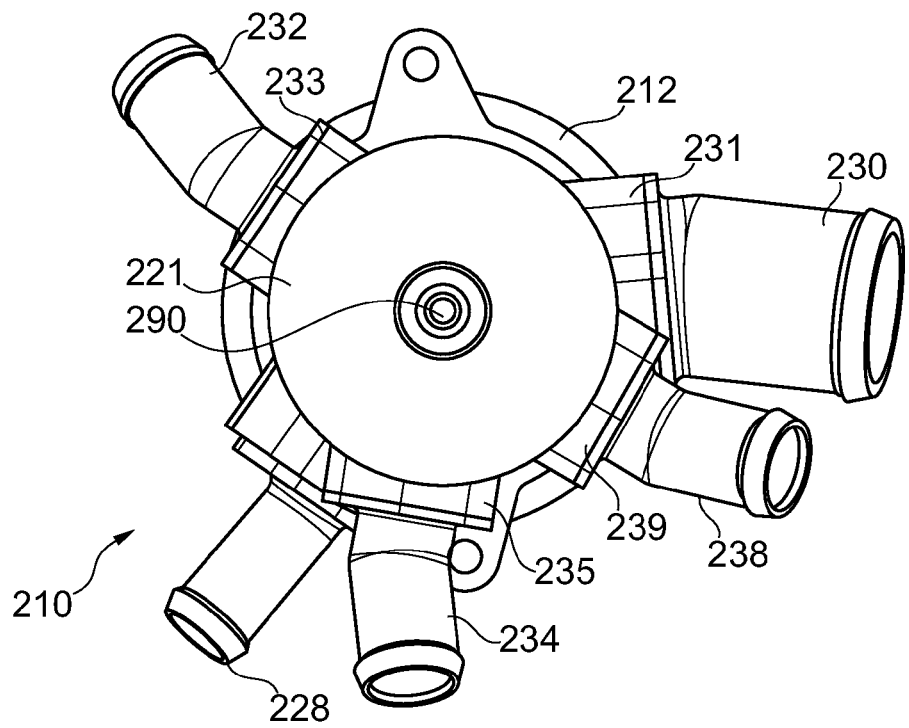
FIG. 8 is a bottom view of the thermal management valve module of FIG. 7.
Figure 9:
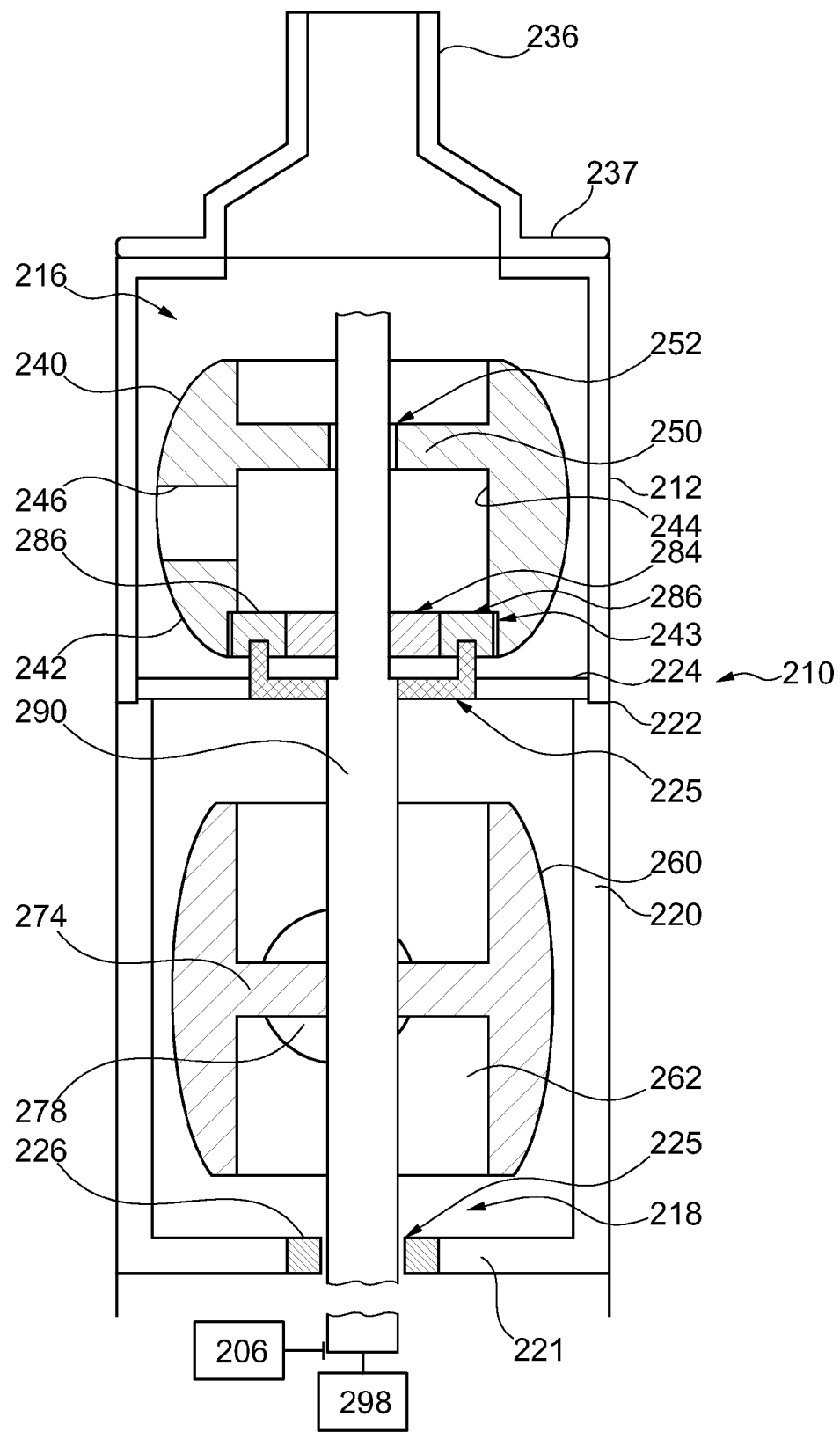
FIG. 9 is a cross-sectional view through the thermal valve management module of FIG. 7 showing an epicyclic gear arrangement for controlling movement of the first and second valve bodies.

Referring to FIGS. 7-9, a third embodiment of a thermal management valve 210 with an actuator arrangement for separately controlling a position of the first valve body 240 and the second valve body 260 within the valve housing 212 is shown.

As shown in FIG. 7, the valve module 210 includes a valve housing 212 formed with a preferably cylindrical housing wall 220 having a base 221 with a centering feature. An upper end of the valve housing 212 is closed via an end cover 214.

As shown in FIG. 9, preferably the housing 212 is divided into a first flow chamber 216 and a second flow chamber 218 by an isolating wall 224. In a preferred embodiment, the isolating wall 224 is a separate disk that is seated on a shoulder 222 formed on an inside of the housing wall 220. This isolating wall 224 can be seated with a seal, if desired. Additionally, it can be formed of an insulating material in order to provide thermal insulation between the first and second flow chambers 216, 218. However, the isolating wall could be omitted, and a single flow chamber provided.

As shown in FIG. 9, the isolating wall 224 includes an opening 225 through which the actuator shaft 290 extends. A seal 226 can be pressed in the opening 225 in order to provide sealing against the actuator shaft 290. The seal 226 can also act as a bearing for supporting the shaft 290.

As shown in detail in FIG. 7, a plurality of ports which act as inlets and outlets are connected to the housing 212. A first port 228, which can be a first inlet port 228, is located on the housing 212 and connects to the first flow chamber 216. Preferably, the first port 228 is connected to the housing 212 via a mounting flange 229. This can be welded, screwed, adhered or otherwise connected to the valve housing 212. An additional port 330, preferably also an inlet port 230, is preferably located on the valve housing 212 that connects to the first flow chamber 216. This additional port 230 is also connected to the valve housing 212 via a mounting flange 231. An axial end port 236, preferably an outlet port 336, is preferably also located on the valve housing 212 that connects to the first flow chamber 216. This is connected via a flange 237, shown in FIG. 7, which can be placed over the end disk 214 and can be sealed in position via a gasket or sealing material. The mounting flanges 229, 231, 237 can be connected via screws, welding, adhesive, or any other suitable means.

A second port 232 is located on the valve housing 212 and connects to the second flow chamber 218. Preferably a second additional port 234 is also located on the valve housing 212 and connects to the second flow chamber 218. A further port 238, preferably a second outlet port, is located on the valve housing 212 and connects to the second flow chamber 218. The second inlet port 232, the second additional inlet port 234, as well as the second outlet port 238 are preferably connected via respective mounting flanges 233, 235, 239 to the housing wall 220 of the valve housing 122. The mounting flanges 233, 235, 239 can be connected via screws, welding, adhesive, or any other suitable means.

Referring to FIG. 9, a first valve body 240 is rotatably positioned in the first flow chamber 216. The first valve body 240 is preferably a spheroid body having an outer surface 242 defined in cross-section by a curved shape that remains constant as it extends in a peripheral direction about a rotational axis. The inlet and outlet port openings in the housing 212 that engage the spheroid body forming the first valve body 240 have a complementary sealing seat located around the respective inlet and outlet openings that engage the spheroid body. The first valve body 240 preferably has a hollow center 244. A fluid pathway is defined through the first valve body 240 that connects the first inlet port 228 to the flow chamber 216, and preferably connects to the first outlet port 36 in a first rotational position of the first valve body 240, and that prevents flow from the first outlet port 236 in a second rotational position of the first valve body 240. Preferably the first valve body 240 throttles the flow from the first inlet port 228 to the first outlet port 236 in an intermediate position. The first valve body 240 has a fluid opening 246 defined through the valve body wall to the hollow center 244. As shown in FIG. 9, preferably at least one support web 250 extends from the outer wall of the valve body 240 to a center shaft connection 252 adapted for support on or connection to the shaft 290. The opening 246 in the valve body 240 can connect one or both of the first inlet port and additional inlet port 228, 230 to the first outlet port 236 via the hollow center 244. The first valve body 240 is rotatably movable in the first flow chamber 216 to a third rotational position in which the fluid pathway connects the additional inlet port 230 and the first outlet port 236, as well as to a second intermediate position in which the flow from the first inlet port 228 and the additional inlet 230 is mixed in the first flow chamber 216 and delivered to the first outlet port 236. The second intermediate position is controllable by rotatable movement of the first valve body 240 so that the proportion of flow from the first inlet port 228 and the additional inlet port 230 is controlled so that, for example, a volume of fluid at a first temperature from the first inlet port 228 is proportionally adjustable relative to a volume of fluid at a second temperature from the additional inlet port 30 so that a desired temperature fluid is delivered to the first outlet port 236.

Still with reference to FIG. 9, a second valve body 260 is rotatably positioned in the housing 212, preferably in the second chamber 218. The second valve body 260 includes a fluid pathway that preferably connects the second inlet port 232 and the second outlet port 238 in a first rotational position of the second valve body 260. The second valve body 260 is rotatable to a second rotational position that prevents flow from the second outlet port 238. Additionally, the second valve body 260 is movable to an intermediate position in which the flow from the second inlet port 232 to the second outlet port 238 is throttled. Preferably, the second valve body 260 is also formed as a spheroid body and the inlet and outlet ports in the housing 212 that engage the second valve body 260 have complementary sealing seats located around the respective inlet and outlet openings that engage the spheroid body. As shown in detail in FIG. 3, the second valve body 260 preferably has a hollow center 262 and the wall of the valve body 260 includes at least one opening 278. A support web 274 preferably extends from the valve body 260 wall to a center area for engagement or support on the actuator shaft 290.

Preferably, the second valve body 260 is rotatably movable in the second chamber 218 to a third rotational position in which the fluid pathway connects the additional inlet port 234 of the second flow chamber 218 and the second outlet port 238. Additionally, the second valve body 260 is movable to a second intermediate position of the second valve body 260 in which the flow from the second inlet port 232 and the additional inlet port 234 of the second flow chamber 218 is mixed in the second flow chamber 218 and is delivered to the second outlet port 238. This allows a mixture of flows from the second inlet port 232 and additional inlet port 334 to be mixed depending upon a rotational position of the second valve body 360 allowing for example, a specific temperature of the fluids being transferred through the thermal management valve module 210 to be controlled in a similar manner as discussed above in connection with the first valve body 240 in the first flow chamber 216.

Due to the isolated arrangement of the first flow chamber 216 and the second flow chamber 218, two different outlet temperatures can be provided from the outlet ports 236 and 238 of the first and second flow chambers 216, 218.

Still with reference to FIG. 9, the actuator shaft 290 extends axially through the valve housing 212 and is supported via an upper support bearing (not shown), an intermediate support 225 in the isolating wall 224, and a lower bearing 226. The intermediate support 225 can be a bearing that also provides a sealing function. The lower bearing 226 can also provide a sealing function to seal the lower end of the actuator shaft 290 from the actuator. The actuator is preferably a rotary actuator 298 that is connected to the actuator shaft 290. Both valve bodies 240, 260 can be directly connected to the shaft 290 which would only allow adjustment of the valve bodies at the same time and the same amounts, limiting the functionality of the thermal management valve module 210.

In order to provide independent positioning control of the first and second valve bodies 240, 260, an epicyclic gearing arrangement is used to indirectly connect the first valve body 240 to the actuator shaft 290 and the second valve body 260 is directly fixed to the actuator shaft 290. In the first preferred embodiment, the first valve body 240 is mounted to be rotatable about the actuator shaft 290 via a sliding fit opening 252 in a support 250 that extends from an inner wall of the hollow valve body 240. The inside of the first valve body 240 around a periphery of the hollow inner space 244 includes teeth 243. Alternatively a ring gear with internal teeth is connected to the first valve body 240. Planet gears 286, supported on a planet arms that may be formed as a part of the intermediate support 225 or on the isolating wall 224, engage the teeth 243. A sun gear 284 is engaged on the actuator shaft 290 and engages the teeth of the planet gears 286. Using this arrangement, a complete rotation of the actuator shaft 290, with a corresponding complete rotation of the second valve body 260, only results in a partial rotation of the first valve body 240 due to the reduction gear provided via the sun gear 284 and planet gears 286.

In one preferred arrangement, the sun gear 284 and at least one planet gear 286 provide a gear reduction of 8:1 or greater, so that a full rotation of the actuator shaft only rotates the first valve body 45°. Accordingly, the actuator shaft 290 can be rotated until the first valve body 240 is moved to a desired rotational position—i.e., the first, second or third rotational positions, the first or second intermediate positions, as well as throttled or proportional mixing positions therebetween. The actuator 298 can then rotate the second valve body 260 to the desired position—i.e., the first, second or third rotational positions, the first or second intermediate positions, as well as throttled or proportional mixing positions therebetween—by rotating, for example, up to + or −180°. This can result in a movement of up to + or −22.5° of the first valve body 240. This is accounted for in the size that the fluid opening 246 extends in the peripheral direction in the first valve body 240 and optionally the positioning of the first and third inlets (not shown ion FIG. 7, but similar to FIG. 1) so that minor deviations in position still allow the desired flow into the first flow chamber from the first and/or additional inlet(s) that is directed to the first outlet. Alternatively, lower gear ratios of, for example, 2:1 or 4:1 could be used, or higher gear ratios for even less positional deviation of the first valve body 240 during positioning of the second valve body 260 may be useful in certain applications. Accordingly, a single rotary actuator 298 connected to the actuator shaft 290 can be used to basically independently adjust a position of the first valve body 240 relative to the second valve body 260.

A position sensor 206 is preferably provided along the actuator shaft 290 or is provided as part of the rotary actuator 298. The position sensors can be integrated with the rotary actuator(s) or provided separately along the shaft 290. The sensors can be in the form of a rotary encoder or any other suitable position sensor as would be understood by a person of ordinary skill in the art.

Those skilled in the art will recognize from the present disclosure that different arrangements of the epicyclic gear arrangement can be provided in order to control the position of the first valve body 240.

Referring now to FIG. 10, a fourth embodiment of the valve module 310 is schematically shown, which includes the first and second valve bodies 340, 360, located in the housing 312 in first and second flow chambers 316, 318 that separated by the isolating wall 324. A bearing/seal 325 is arranged in the isolating wall 324 to support the actuator shaft 390 and also prevent cross-flow of fluids between the chambers 316, 318. A sliding fit opening 352 is provided between the first valve body 340 and the actuator shaft 390. The functionality of the valve module 310 is similar to the valve module 210 described above, and the differences related to the epicyclic gear arrangement to control the position of the first valve body 340 will be described below.

In the fourth embodiment, the sun gear 384 is attached to the actuator shaft 390, and acts as the input component. The planet arm 385 with at least one planet gear 386 is fixed to the first valve body 340 and acts as the output component. The ring gear 343 is fixed to the stationary housing 312 and acts as the fixed component. Here, different gear ratios can be achieved for increasing or decreasing the speed of the first valve body 240 relative to the second valve body 260.

Figure 11:
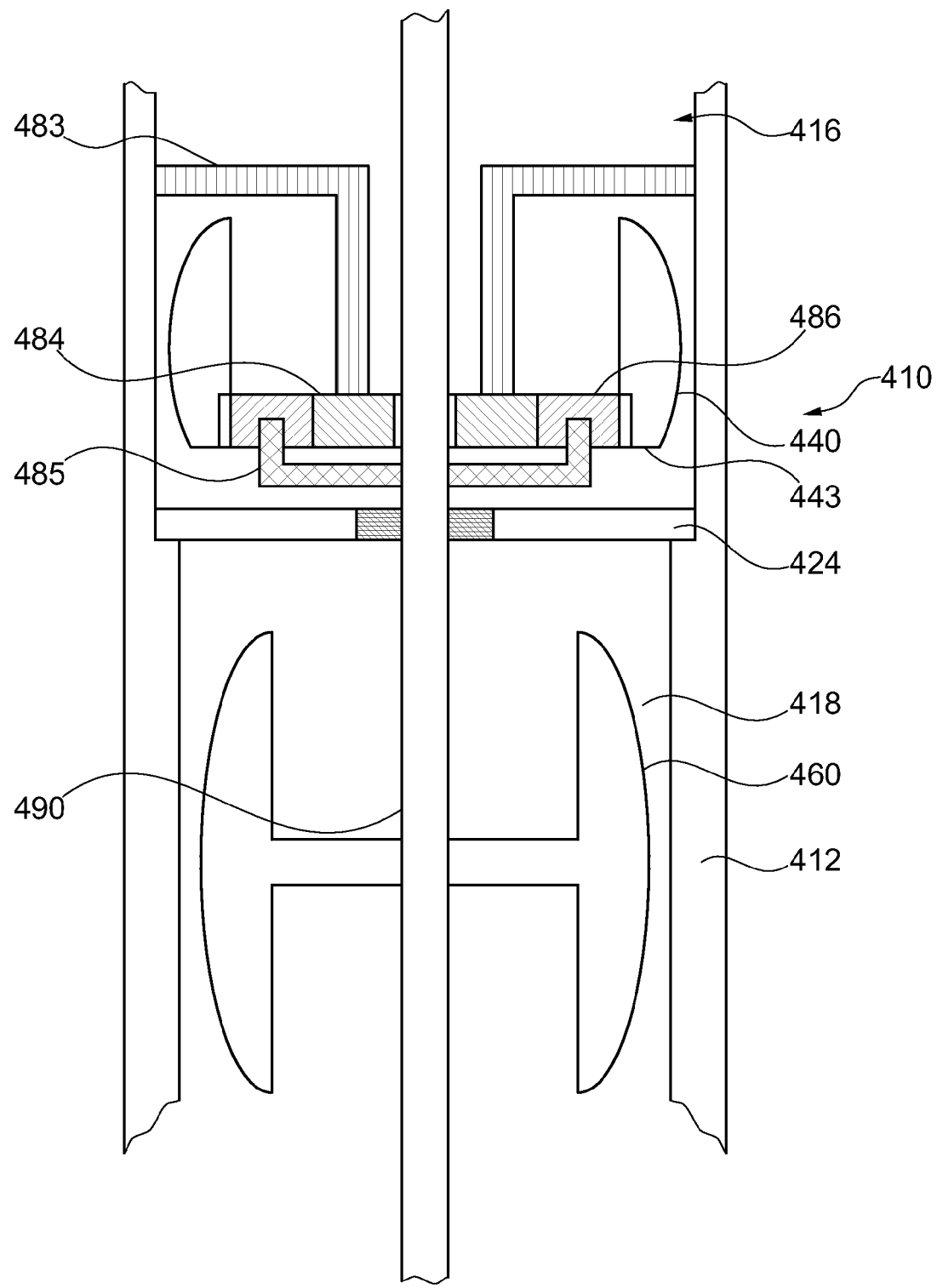
FIG. 11 is a cross-sectional view of a fifth embodiment of a thermal valve management module showing an epicyclic gear arrangement for controlling movement of the first and second valve bodies.

Referring now to FIG. 11, a fifth embodiment of the valve module 410 is schematically shown. The fifth embodiment of the valve module 410 is similar to the third and fourth embodiments, and like elements are identified with similar element numbers. The valve module 410 includes the first and second valve bodies 440, 460, located in the housing 412 in first and second flow chambers 416, 418 that separated by the isolating wall 424. Various locating or centering features can be used to maintain the position of the first valve body 440, which would be understood by the skilled artisan, such as centering features extending from the inside of the housing 412 that engage the outer spheroidal surface of the first valve body 440. The functionality of the valve module 410 is similar to the valve modules 210 and 310 described above, and the differences related to the epicyclic gear arrangement to control the position of the first valve body 440 will be described below.

In the fifth embodiment, the planet arm 485 with the at least one planet gear 486 is the input component, fixed to the actuator shaft 490. The ring gear 443 is fixed to or formed on an inner periphery of the first valve body 440, in a similar manner to the valve body 240 above, and acts as the output component. The sun gear 484 is fixed to the housing 412, for example by a fixed arm 483 extending from the housing 412 as the fixed component. Again, different gear ratios can be achieved for increasing or decreasing the speed of the first valve body 440 relative to the second valve body 460, as well as possible movement of the valve bodies in opposite directions, depending on the gear ratios.

Figure 12:
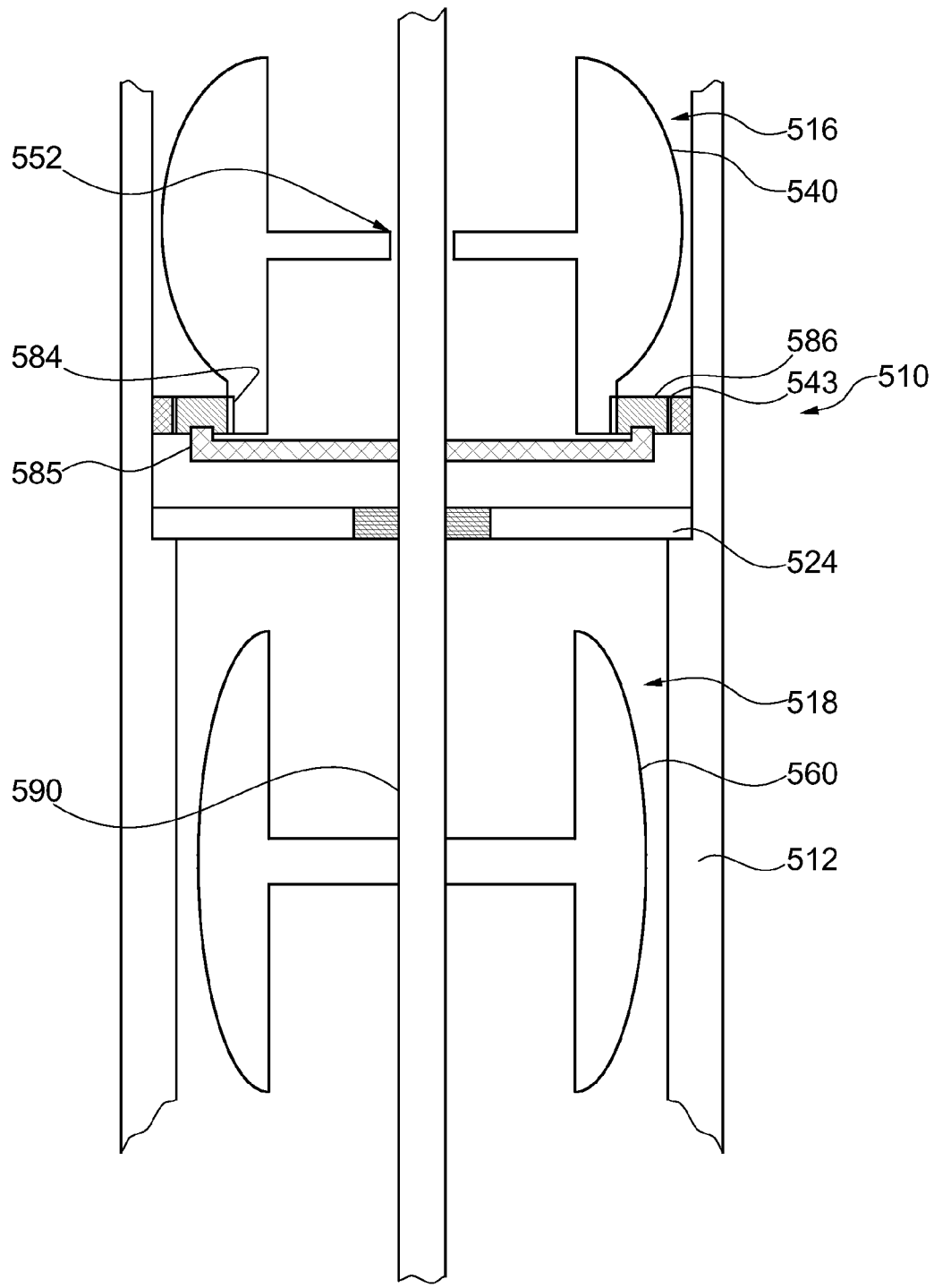
FIG. 12 is a cross-sectional view of a sixth embodiment of a thermal valve management module showing an epicyclic gear arrangement for controlling movement of the first and second valve bodies.

Referring now to FIG. 12, a sixth embodiment of the valve module 510 is schematically shown. The sixth embodiment of the valve module 510 is similar to the third through fifth embodiments, and like elements are identified with similar element numbers. The valve module 510 includes the first and second valve bodies 540, 560, located in the housing 512 in first and second flow chambers 516, 518 that separated by the isolating wall 524. Various locating or centering features can be used to maintain the position of the first valve body 540, such as centering features extending from the inside of the housing 512 that engage the outer spheroidal surface of the first valve body 540 as well as the sliding fit opening 552 is provided between the first valve body 540 and the actuator shaft 590. The functionality of the valve module 510 is similar to the valve modules described above, and the differences related to the epicyclic gear arrangement to control the position of the first valve body 540 will be described below.

In the sixth embodiment, the planet arm 585 with the at least one planet gear 586 is the input component, fixed to the actuator shaft 590. The sun gear 586 is fixed to the first valve body 540 or formed directly on an outer periphery thereof as the output component. The ring gear 543 is fixed to the housing 512 as the fixed component. Again, different gear ratios can be achieved for increasing or decreasing the speed of the first valve body 540 relative to the second valve body 560.

Figure 13:
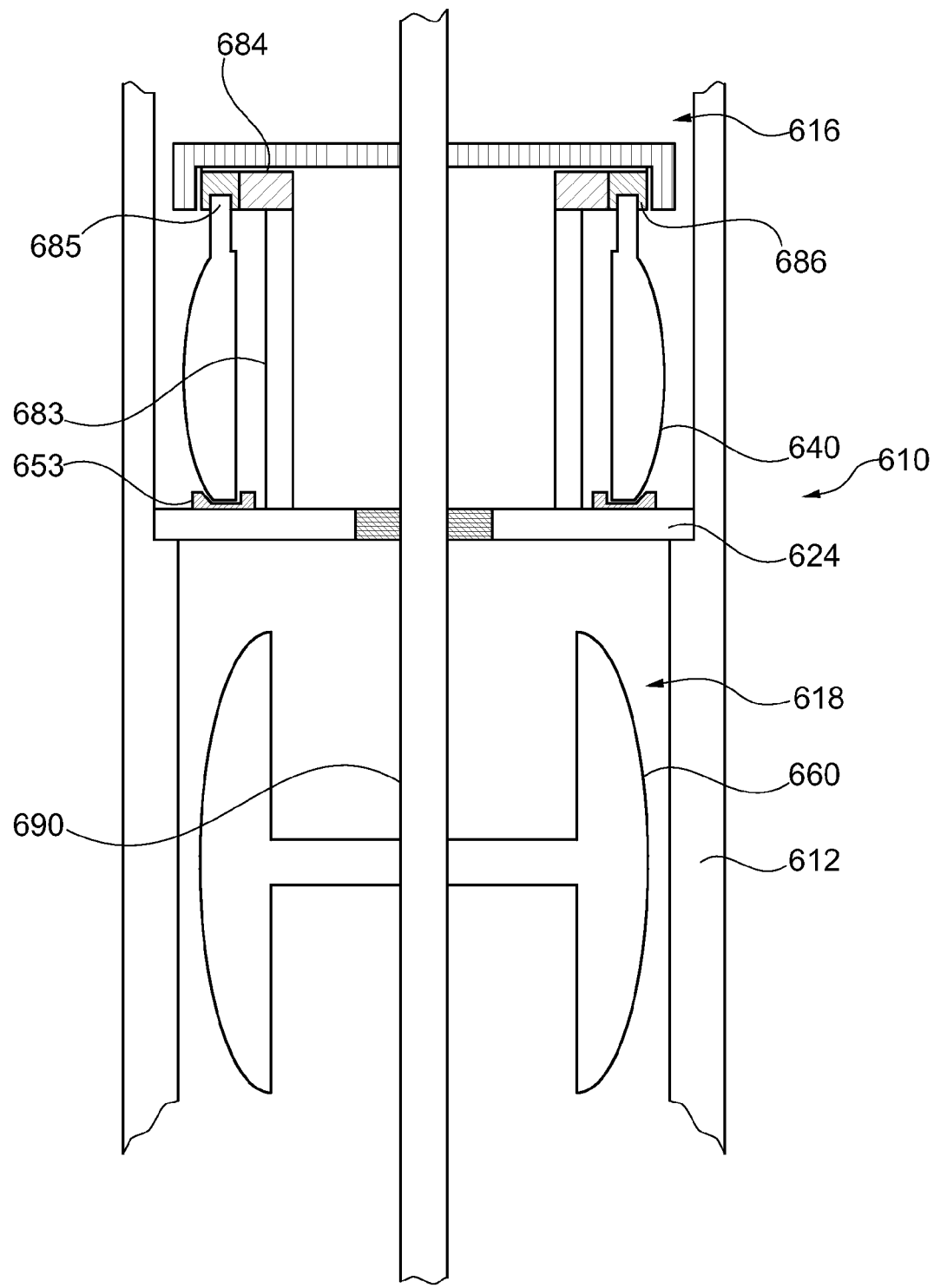
FIG. 13 is a cross-sectional view of a seventh embodiment of a thermal valve management module showing an epicyclic gear arrangement for controlling movement of the first and second valve bodies.

Referring now to FIG. 13, a seventh embodiment of the valve module 610 is schematically shown. The seventh embodiment of the valve module 610 is similar to the third through sixth embodiments, and like elements are identified with similar element numbers. The valve module 610 includes the first and second valve bodies 640, 660, located in the housing 612 in first and second flow chambers 616, 618 that separated by the isolating wall 624. Various locating or centering features can be used to maintain the position of the first valve body 640, such as centering features extending from the inside of the housing 612 that engage the outer spheroidal surface of the first valve body 640 as well as a support 653 provided on the isolating wall 624. The functionality of the valve module 610 is similar to the valve modules described above, and the differences related to the epicyclic gear arrangement to control the position of the first valve body 640 will be described below.

In the seventh embodiment, the ring gear 643 is the input component, fixed to the actuator shaft 690. The planet arm 685 is fixed to the first valve body 640, and has at least one planet gear 586, as the output component. The sun gear 684 is fixed to the housing 612, for example by support 683 connected to the isolating wall 624 as the fixed component. Here, the epicyclic gear arrangement is located at the top of the first valve body 640 so that the first valve body 640 can be supported on its bottom end by the support 653, which is preferably a sliding bearing component or PTFE coated sliding race. Again, different gear ratios can be achieved for increasing or decreasing the speed of the first valve body 640 relative to the second valve body 660.

Figure 14:
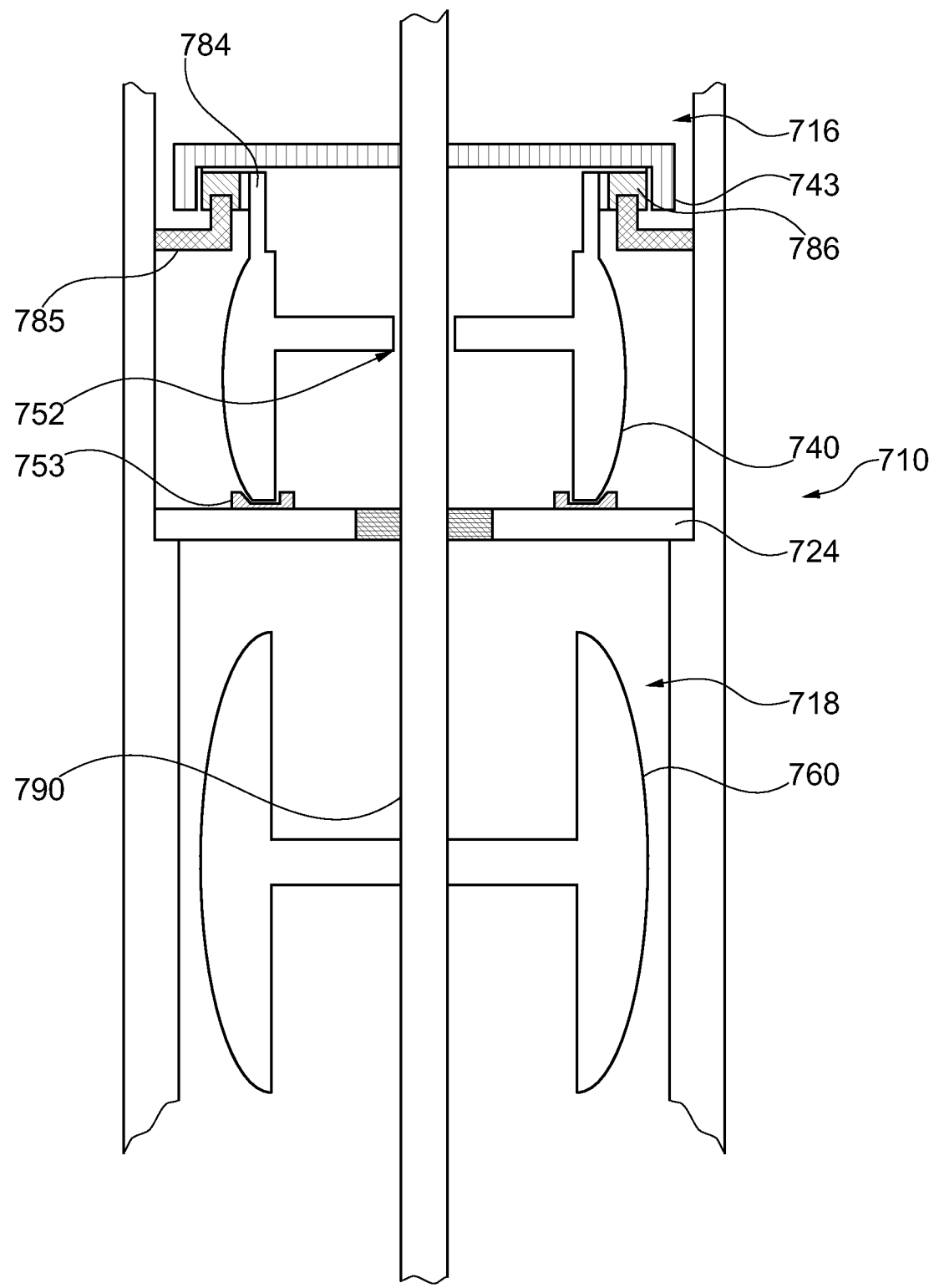
FIG. 14 is a cross-sectional view of a eighth embodiment of a thermal valve management module showing an epicyclic gear arrangement for controlling movement of the first and second valve bodies.

Referring now to FIG. 14, an eighth embodiment of the valve module 710 is schematically shown. The eighth embodiment of the valve module 710 is similar to the third through seventh embodiments, and like elements are identified with similar element numbers. The valve module 710 includes the first and second valve bodies 740, 760, located in the housing 712 in first and second flow chambers 716, 718 that separated by the isolating wall 724. Various locating or centering features can be used to maintain the position of the first valve body 740, such as centering features extending from the inside of the housing 712 that engage the outer spheroidal surface of the first valve body 740 as well as a support 753 provided on the isolating wall 724, and a sliding clearance 752 with the actuator shaft 790. The functionality of the valve module 710 is similar to the valve modules described above, and the differences related to the epicyclic gear arrangement to control the position of the first valve body 740 will be described below.

In the eighth embodiment, the ring gear 743 is the input component, fixed to the actuator shaft 790. The sun gear 784 is fixed to the valve body 740 or formed on an outer periphery thereof as the output component. The planet arm 785 is fixed to the housing 712 as the fixed component. Here, the epicyclic gear arrangement is located at the top of the first valve body 740 so that the first valve body 740 can be supported on its bottom end by the support 753, which is preferably a sliding bearing component or PTFE coated sliding race. Again, different gear ratios can be achieved for increasing or decreasing the speed of the first valve body 740 relative to the second valve body 760.

Those skilled in the art will understand that in each of the above embodiments, the position sensor 206 can be utilized on the actuator shaft in order to accurately determine a position of the valve bodies.

Figure 15:
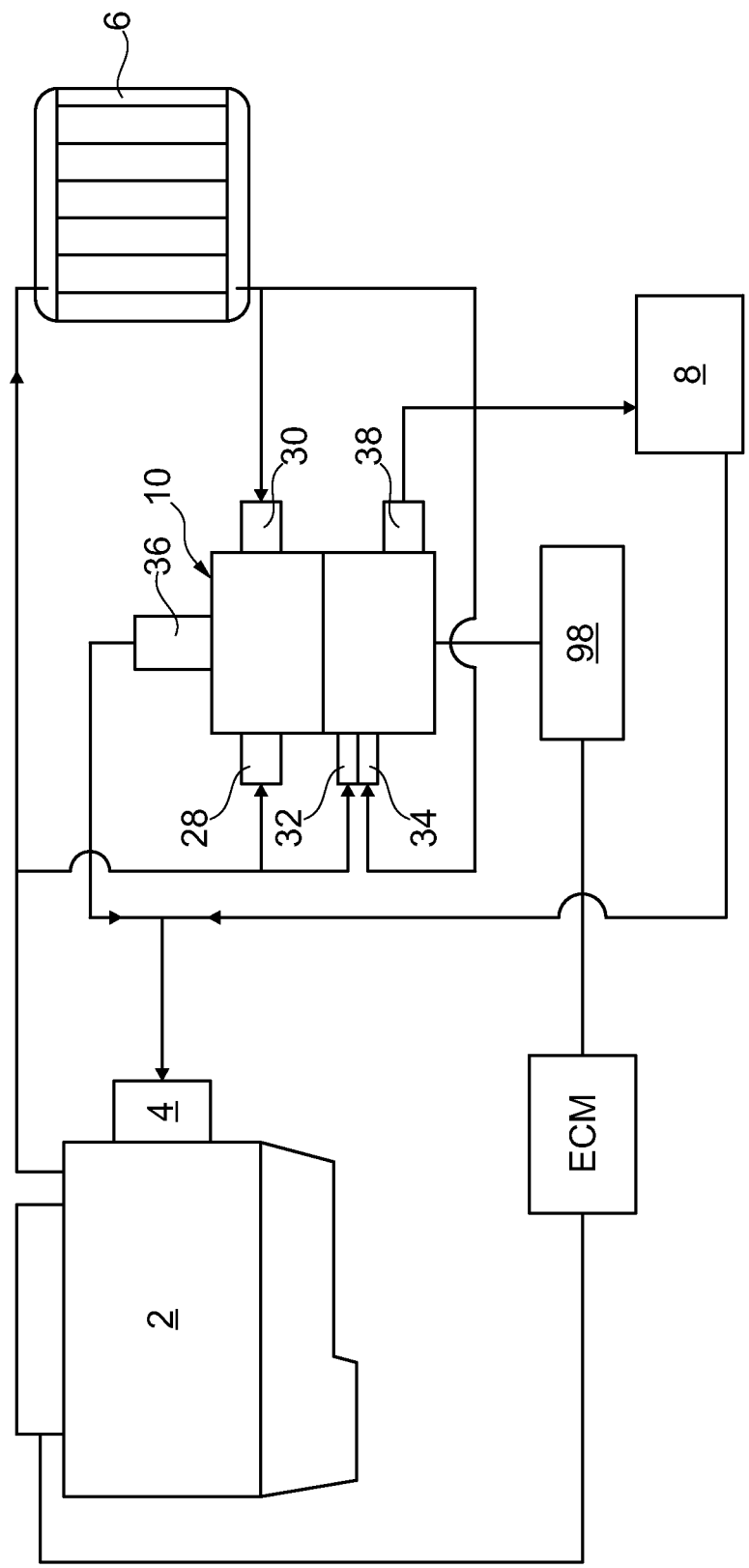
FIG. 15 is a schematic view of a thermal management system for a motor vehicle utilizing the thermal management valve module according to the invention.

Referring now to FIG. 15, a schematic view of a thermal management system for a motor vehicle is shown using the thermal management valve module 10, 210, 310, 410, 510, 610, 710. Here, the internal combustion engine 2 is shown as the heat source and a water pump 4 is shown connected to the internal combustion engine 2. A radiator 6 is shown as the primary heat exchanger, along with a cabin heat exchanger 8 for heating a passenger compartment. Although the cabin heat exchanger is shown, those skilled in the art will recognize that this could be an oil cooler heat exchanger, a transmission fluid heat exchanger, an EGR heat exchanger, etc. In this case, the water pump 4 is connected to a cooling circuit which pushes cooling fluid through the water jackets in the engine block to the radiator 6 or the first inlet 28 of the valve module 10, 210, 310, 410, 510, 610, 710. Fluid can be directed from the radiator 6 to the first flow chamber 16 via the third inlet 30. Depending upon a position of the first valve body, hot fluid from the engine is either recirculated via the first inlet port 28 to the first outlet port 36 and back to the water pump 4 for recirculation in order to more quickly heat up the engine block, or, upon the engine block reaching a desired temperature, only cooling fluid which has circulated through the radiator 6 to lose heat is circulated via the additional inlet 30 port to the first flow chamber 16 and back through the outlet port 36 to the water pump 4. If it is desired to maintain a precise temperature, the first valve body is adjusted to a position where the flows from the first inlet port and additional inlet port 28, 30 are mixed with desired proportions in the first flow chamber.

The second flow chamber 18 which is isolated from the first flow chamber also includes the second inlet port 32 for hot water from the engine block as well as the fourth inlet 34 to receive cooling fluid which has passed through the radiator 6. Depending upon the position of the second valve body, fluid of a desired temperature can then be directed via the second outlet port 38 to the passenger compartment heat exchanger 8 prior to being recirculated back to the water pump 4. This arrangement allows for independent control of the outlet temperatures of the cooling fluid through the first outlet port and second outlet port 36, 38.

It is also possible for a single valve body 40 or 60 to be used to control the distribution of coolant to multiple heat exchangers by having multiple outlets for each of the flow chambers 16, 18 that are independent of each other. That is, two outlets are controlled with openings in the valve body 40, 60 so that one or both of the outlets are open and/or closed at different positions. For example, it can be useful to open the cabin heater loop before sending heated coolant to the transmission cooler, for example, in order to increase passenger comfort.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A thermal management valve module, comprising:
   a housing with at least one flow chamber;
   a first port and a second port on the housing;
   a first valve body rotatably positioned in the at least one flow chamber, the first valve body including a fluid pathway that, in a first rotational position, connects the first port to the at least one flow chamber, and in a second rotational position, prevents flow from the first port, and in an intermediate position, throttles the flow from the first port to the at least one flow chamber;
   a second valve body rotatably positioned in the at least one flow chamber, the second valve body including a fluid pathway that in a first rotational position of the second valve body connects the second port to the at least one flow chamber, and in a second rotational position of the second valve body, prevents flow from the second port, and in an intermediate position of the second valve body throttles the flow from the second port;
   an actuator arrangement that controls the positions of the first and second valve bodies, including an actuator shaft that extends axially through the valve bodies that is connected rotationally fixed to one of the valve bodies, and connected by an indirect connection to the other of the valve bodies such that movement of the actuator shaft does not require a corresponding movement of the other valve body; and the rotationally fixed connection is a direct connection of the actuator shaft to the first valve body, and the indirect connection comprises an indexing arm connected to the actuator shaft and a positioning catch located on the second valve body in a same radially extending plane as the indexing arm.

2. The thermal management valve module of claim 1, further comprising an isolating wall located in the housing that separates the housing into a first flow chamber and a second flow chamber that are isolated from one another, wherein the first port is a first inlet port that connects to the first flow chamber, and the second port is a second inlet port that connects to the second flow chamber.

3. The thermal management valve module of claim 2, further comprising a first outlet port on the housing that connects to the first flow chamber, and a second outlet port on the housing that connects to the second flow chamber, wherein a rotational position of the first valve body controls a flow from the first flow chamber and a rotational position of the second valve body controls a flow from the second flow chamber.

4. The thermal management valve module of claim 3, wherein an additional inlet port is located on the housing that connects to the first flow chamber, and the first valve body is rotatably moveable in the first flow chamber to a third rotational position in which the fluid pathway connects the additional inlet port and the first outlet port, and the first valve body is rotatably movable to a second intermediate position to provide a flow path from the first inlet port and the additional inlet port which allows inlet flows to mix in the first fluid chamber and a mixed first chamber flow is delivered to the first outlet.

5. The thermal management valve module of claim 4, wherein an additional inlet port is located on the housing that connects to the second flow chamber, and the second valve body is rotatably movable in the second chamber to a third rotational position in which the fluid pathway connects the additional inlet port of the second flow chamber and the second outlet port, and the second valve body is rotatably movable to a second intermediate position to provide a flow path from the second inlet port and the additional inlet port of the second flow chamber which allows the inlet flows to mix in the second fluid chamber and a mixed second chamber flow is delivered to the second outlet port.

6. The thermal management valve module of claim 1, wherein the indexing arm is adapted to rotate at least about 355° from a position in which it contacts a first face of the positioning catch to a position in which it contacts an opposite face of the positioning catch.

7. The thermal management valve module of claim 1, wherein the second valve body is rotationally fixed in position by friction created by seals at the second inlet port and the second outlet port.

8. The thermal management valve module of claim 7, wherein a holding force of the second valve body is adjusted by a surface finish or a coating on the second valve body.

9. The thermal management valve module of claim 1, wherein contact of the indexing arm against the positioning catch is adapted to rotate the second valve body.

10. The thermal management valve module of claim 1, wherein a capacitive sensor is connected to the actuator shaft to detect a rotary contact position with the positioning catch.

11. The thermal management valve module of claim 1, wherein a rotary position sensor is located along the actuator shaft.

12. The thermal management valve module of claim 1, wherein a positioning sensor is located on the actuator shaft.

13. A thermal management valve module, comprising:
a housing with at least one flow chamber;
a first port and a second port on the housing;
a first valve body rotatably positioned in the at least one flow chamber, the first valve body including a fluid pathway that, in a first rotational position, connects the first port to the at least one flow chamber, and in a second rotational position, prevents flow from the first port, and in an intermediate position, throttles the flow from the first port to the at least one flow chamber;
a second valve body rotatably positioned in the at least one flow chamber, the second valve body including a fluid pathway that in a first rotational position of the second valve body connects the second port to the at least one flow chamber, and in a second rotational position of the second valve body, prevents flow from the second port, and in an intermediate position of the second valve body throttles the flow from the second port;
an actuator arrangement that controls the positions of the first and second valve bodies, including an actuator shaft that extends axially through the valve bodies that is connected rotationally fixed to one of the valve bodies, and connected by an indirect connection to the other of the valve bodies such that movement of the actuator shaft does not require a corresponding movement of the other valve body;
the rotationally fixed connection is a direct connection of the actuator shaft to the second valve body, and the indirect connection comprises an epicyclic gear arrangement including a sun gear, at least one planet gear, and a ring gear between the actuator shaft and the first valve body, wherein the sun gear is fixed to the housing, the at least one planet gear is connected to one of the actuator shaft or the first valve body, and the ring gear is connected to the other of the actuator shaft or the first valve body, or the sun gear is fixed to the first valve body and the at least one planet gear is connected to one of the actuator shaft or the housing, and the ring gear is connected to the other of the actuator shaft or the housing, such that rotation of the actuator shaft rotates the first valve body at a reduced gear ratio relative to the second valve body.

14. The thermal management valve module of claim 13, wherein the at least one planet gear is located on an arm that extends from one of the actuator shaft, the first valve body, or the housing that is not connected to the sun gear or the ring gear.

15. The thermal management valve module of claim 14, wherein the arm that supports the at least one planet gear is connected to the housing.

16. The thermal management valve module of claim 13, wherein the first valve body is hollow and the ring gear is located on an inner periphery of the first valve body.

17. The thermal management valve module of claim 13, wherein the sun gear and the at least one planet gear provide a gear reduction of 3:1 or greater.

18. A thermal management valve module, comprising:
a housing;
an isolating wall located in the housing that separates the housing into a first flow chamber and a second flow chamber that are isolated from one another;

a first inlet on the housing that connects to the first flow chamber;

a first outlet on the housing that connects to the first flow chamber;

a second inlet on the housing that connects to the second flow chamber;

a second outlet on the housing that connects to the second flow chamber;

a first valve body rotatably positioned in the first flow chamber, the first valve body including a fluid pathway that, in a first rotational position, connects the first inlet and the first outlet, and in a second rotational position, prevents flow from the first outlet, and in an intermediate position, throttles the flow from the first inlet to the first outlet;

a second valve body rotatably positioned in the second flow chamber, the second valve body including a fluid pathway that in a first rotational position of the second valve body connects the second inlet and the second outlet, and in a second rotational position of the second valve body, prevents flow from the second outlet, and in an intermediate position of the second valve body throttles the flow from the second inlet to the second outlet;

an actuator arrangement that independently controls the positions of the first and second valve bodies, including a first actuator shaft connected to the first valve body and a second actuator shaft connected to the second valve body, the first and second actuator shafts extending along a common axis; and a central opening is located in the isolating wall and the first actuator shaft includes an end that extends through the central opening and is received for pivoting movement in a corresponding opening in a facing end of the second actuator shaft allowing independent rotational movement of the first and the second actuator shafts.

19. The thermal management valve module of claim 18, wherein first and second positioning sensors are located on the respective first and second actuator shafts.

* * * * *